United States Patent [19]
Schulten

[11] 3,753,151
[45] Aug. 14, 1973

[54] MODE SELECTOR FOR SCAN LASER
[75] Inventor: Günter Schulten, Wedel, Germany
[73] Assignee: U.S. Philips Corporation, New York, N.Y.
[22] Filed: June 2, 1972
[21] Appl. No.: 259,191

[30] Foreign Application Priority Data
June 3, 1971 Germany.................. P 21 27 463.5

[52] U.S. Cl................................. 350/160, 331/94.5
[51] Int. Cl............................................ G02f 1/26
[58] Field of Search.................... 331/94.5; 350/160, 350/147, 150

[56] References Cited
UNITED STATES PATENTS
3,519,953   7/1970   Gamblin et al................... 331/94.5
3,644,017   2/1972   Ploss.................................. 350/160

Primary Examiner—William L. Sikes
Attorney—Frank R. Trifari

[57] ABSTRACT

The invention relates to a mode selector having a plate showing an electro-optical effect in an electric field to control the modes of oscillation in a scan laser. The new mode selector consists of two identical selectors which are rotated relative to each other through 90° and which are each arranged in a focal plane of the laser-resonator and of which one controls the $x$ coordinate and the other controls the $y$ coordinate of the focus, in which a plate-shaped electro-optical KDP material is surrounded by grid-shaped electrodes between which electric fields are produced which, with the exception of a strip-shaped region, everywhere exceed a certain minimum intensity but disappear or are very small in the strip-shaped region. The electrodes are two grids of parallel wires and the individual wires have such a potential that either a transverse or a longitudinal electro-optical effect occurs in the electro-optical material.

4 Claims, 4 Drawing Figures

MODE SELECTOR FOR SCAN LASER

The invention relates to a mode selector having a plate which shows an electro-optical effect in an electric field to control the modes of oscillation in a scan laser.

Figure 1:
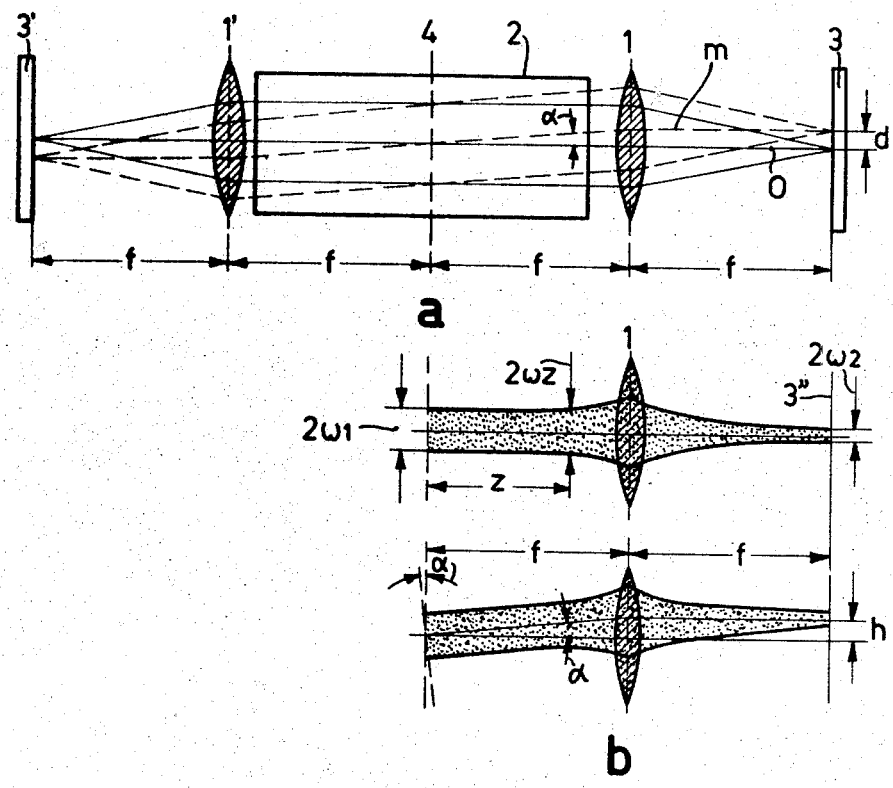

A scan laser is a laser whose output beam can selectively be switched in various directions or be moved parallel in various positions. Like a conventional laser, such a laser consists of an active medium which produces an amplification of the light and a resonator which ensures the feedback coupling and thus produces a self-excitation. The resonator must have a particular property. It must be degenerated; this means that it must be capable of oscillating in various modes of the same frequency. FIG. 1 shows such a resonator. Two lenses 1 and 1' having a focal length $f$ are at a distance $2f$ apart. The active medium 2 is present between said lenses. On either side, parallel flat mirrors 3, 3' are arranged at a distance $f$ from the lenses. Several modes are possible which differ by the angle $\alpha$ between optical axis $o$ and central axis $m$ of the mode. In FIG. 1 two such modes are shown by their axes and their lateral boundary lines (see Meyers, R.A., Pole, R.V.: The electron beam Scanlaser: Theoretical and Operational Studies, IBM Journal Sept., 1967, 502 ). A more exact examination into the mode theory provides the following relationship: in the central plane 4 between the two lenses 1, 1', all modes have a waist of diameter $2\omega_1$ and in the focal plane 3" on the mirrors likewise a waist of diameter $2\omega_2$ (FIG. 1b). Between $\omega_1$ and $\omega_2$ the relationship exists $\omega_1 \omega_2 = f \lambda/\pi$, wherein $f$ is the focal length of the lenses and $\lambda$ the wavelength. For a high resolution of the scan laser (a maximum of foci in the focal plane separated spatially by $d$ and $h$, respectively), $\omega_2$ should be as small as possible. An optimum value for $\omega_2$ results from the dimensions of the active medium.

The resonator shown in FIG. 1 is only one form of a scan laser-resonator. Resonators have also been proposed in which the focal planes lie outside the mirror planes. This has the advantage that unavoidable small errors on the mirrors have no influence on the quality of the resonance.

The device shown in FIG. 1 becomes a scan laser in that various modes which differ by the angle $\alpha$ can be arbitrarily excited, or in other words: it should be possible to excite modes whose foci lie in different selected places of the focal plane with a distance from each other. In the known scan laser, a mode selector is arranged for that purpose in one of the focal planes (that is to say in the plane of one of the mirrors of FIG. 1). This is a device which controls the reflection factor of the mirror so that each time only a certain range having a diameter of approximately $2\omega_2$ is highly reflecting, the remaining mirror is poorly reflecting (for example, less than 80 percent). This occurs as follows: before the mirror is arranged a flat plate of an electro-optical material (KDP) and in addition a double refracting flat plate (quartz). The quartz plate produces a rotation of the plane of polarisation of the light. However, due to the Brewster windows terminating the discharge vessel (it comprises the active plasma) the laser can oscillate only in a certain direction of polarization. A rotation of the plane of polarization therefore results in losses of light on the way there and back. Therefore the laser will not oscillate. By means of an electron beam, an electric charge is now formed in the desired place of the electro-optical material. It produced an electric field in the material. As a result of this, a rotation of the plane of polarization via the so-called Pockels-effect is used which is opposite to that resulting from the quartz. In the case of a correctly chosen field strength, that is to say in the case of the correct charge density, the overall rotation will disappear and the losses are minimum. The quartz then oscillates in a mode which has a focus in the selected place.

The device consisting of the KDP-plate, the quartz plate and the cathode-ray tube thus represents a modulator which controls the transmission of light locally and in time. This device is called optic selector or mode selector.

It is the object of the invention to improve a mode selector. The invention is based on the idea that every scan laser-resonator has at least two focal planes. It is therefore not necessary to control only in one focal plane the place of the focus indicated for example by the coordinates $x$ and $y$. Instead, the invention consists in that the mode selector consists of two identical selectors rotated through 90° relative to each other and each arranged in a focal plane of the laser-resonator and of which one controls the $x$ coordinate and the other controls the $y$-coordinate of the focus.

According to a further embodiment of the invention the electric field strengths for the control are not produced by means of an electron beam but by a system having metallic electrodes. This is particularly simple since the system is only two-dimensional so that the electrodes may be cylindrical.

Figure 2:
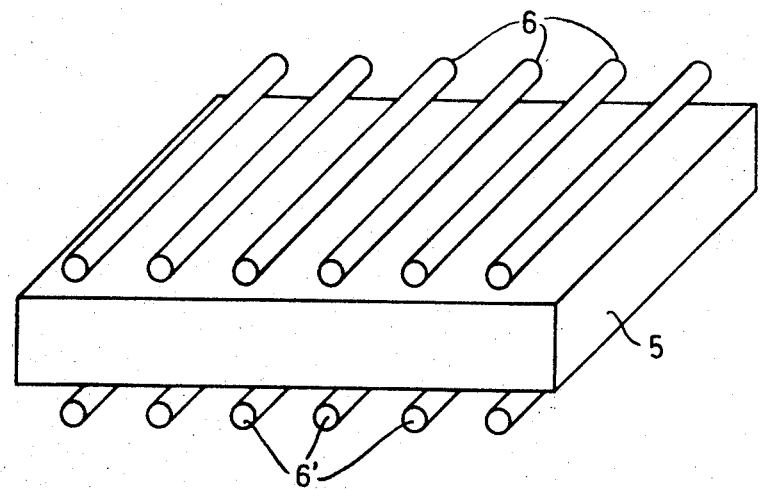

In an embodiment of the invention, the individual selector shown in FIG. 2 is constructed as follows:

A plane parallel layer or plate 5 of electro-optical material (KDP, Nitrobenzene, liquid crystals or other materials which show an electro-optical effect), is provided on either side with two equal grids 6, 6' consisting of parallel wires. The wires should be as thin as possible and have a spacing distance of approximately $2\omega_2$. The two grids are arranged so that each time two wires are located accurately opposite to each other. The electro-optical plate 5 is oriented so that no rotation of the polarization of the light which traverses the plate at right angles occurs when the electric field strength is failing. In order to improve the transmission, both sides of the plate may be provided with layers reducing the reflection.

Figure 3:
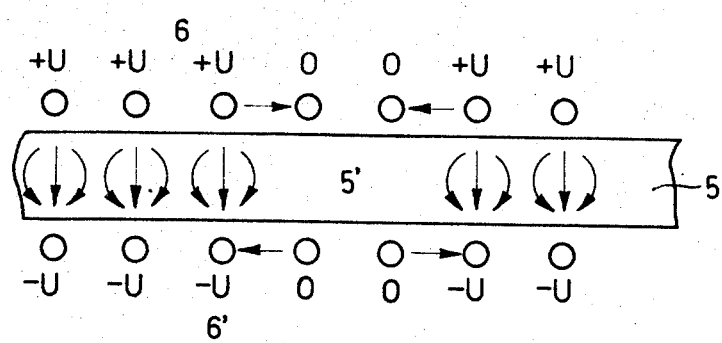

In accordance with the electro-optical material used, longitudinal (i.e. in the direction of the light path) or transverse electric field components may be produced in accordance with the fact whether the wires 6,6' of a grid have the same or alternately opposite potentials. In the case of longitudinal fields, the control occurs in the manner shown in FIG. 3. The wires of one grid 6 have a potential $+U$, those of the other grid 6' have a potential $-U$. Only two selected adjacent wires and the two oppositely located wires have the potential zero. The whole plate 5 is then traversed by electric fields and the electro-optical effect produces a rotation of polarization and thus losses. An exception forms only a strip-shaped region 5' in which no fields occur and which is bounded by the four electrodes of potential zero. No rotation occurs there and thus no attenuation of a light-wave polarized by the Brewster windows.

By switching the potentials on other wires, the strip-shaped region can be moved, selection being possible.

Figure 4:
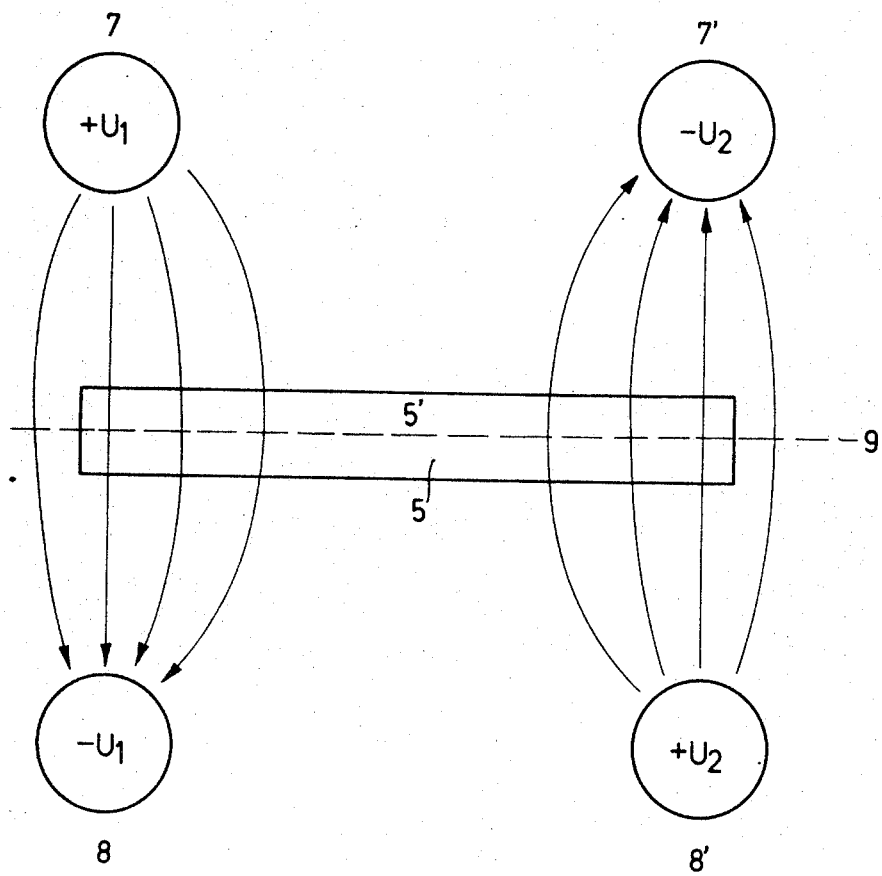

FIG. 4 shows another embodiment of a mode selector. The electro-optical layer 5 is surrounded by four cylindrical electrodes 7, 7', 8, 8'. A voltage $+U_1$ and $-U_1$, respectively, is set up at the two electrodes 7, 8, and accordingly a voltage $-U_2$ and $+U_2$, respectively, is set up at the two electrodes 7', 8'. The sign of the voltages is chosen to be so that a quadrupole field occurs. Such a field is strongly inhomogeneous and has in its centre 5' a field-free region, when $U_1=U_2$. If on the contrary $U_1 \neq U_2$, there will still be a field-free region but it will be shifted laterally in the direction of the electrodes having the smaller voltage. In this manner, a strip-shaped region which is free from electric fields inside the electro-optical material can be locally moved along the line 9 by variation of the electrode voltage. Since only within said region the rotation of the plane of polarization does not occur, the coordinate of the focus in one of the two focal planes is thus fixed. The width of the region in which no rotation of polarization occurs, is accordingly smaller as the values of the voltages $U_1$ and $U_2$ are larger.

What is claimed is:

1. In a mode selector device, for use in a scan laser for controlling modes of oscillation in said laser, the subcombination comprising a plate-like material having an electro-optical effect under the influence of an electric field, grid-shaped electrodes substantially surrounding said plate-like material for providing electric fields for said material, and means for supplying a potential to said grids to form a field exceeding a certain minimum intensity with exception of a strip-shaped region of said material wherein said electric fields are diminished and are capable of being non-existent in said region.

2. The mode selector device of claim 1, wherein said electrodes comprise two grids of substantially parallel wires, and further comprising means for impressing each of said wires with an individual potential wherein the two grids can be provided with a similar field with respect to each other.

3. The mode selector device of claim 1, wherein said electrodes comprise two grids of substantially parallel wires, and further comprising means for impressing each of said wires with an individual potential wherein the two grids can be provided with an opposite field with respect to each other.

4. In a mode selector device for use in a scan laser for controlling modes of oscillation in said laser, the subcombination comprising a plate-like material having an electro-optical effect under the influence of an electric field, four cylindrical electrodes arranged about said material so as to form an electric quadrupole field for said plate-like material, and means for impressing said electrodes with a varying potential, so as to create a movable, centrally located, field-free region in said material.

* * * * *